United States Patent [19]

Williams

[11] 4,178,099
[45] Dec. 11, 1979

[54] SCANNING OPTICAL SPECTRAL ANALYZER

[75] Inventor: Lowell F. Williams, West Caldwell, N.J.

[73] Assignee: The United States of America as represented by the Secretary of the Army, Washington, D.C.

[21] Appl. No.: 846,646

[22] Filed: Oct. 31, 1977

[51] Int. Cl.² .................... G01N 21/00; G01J 3/06
[52] U.S. Cl. ................................ 356/73; 356/308
[58] Field of Search .............. 356/83, 84, 73, 308, 356/309

[56] References Cited

U.S. PATENT DOCUMENTS

| | | | |
|---|---|---|---|
| 3,971,921 | 7/1976 | Schmit et al. | 356/83 |
| 3,992,101 | 11/1976 | Dapper et al. | 356/83 |

*Primary Examiner*—Vincent P. McGraw
*Attorney, Agent, or Firm*—Nathan Edelberg; Jeremiah G. Murray; Edward Goldberg

[57] ABSTRACT

A wide field of view is scanned to determine spectral and positional information of a point source of optical radiation. The wide field of view is optically scanned by a scanner having an instantaneous narrow field of view to sequentially direct radiation from successive scanned portions of the field onto a detector included in an image plane of radiation. An optical dispersion means for the radiation is provided in a first optical path that includes the scanning means and the detector. A second optical path between the source and detector includes the scanning means, but does not include the dispersion means. The dispersion means and the scanning means cause a convolution of spectral energy from the source in the image plane, resulting in a displacement of the relative occurrence times, during a scan, of a wavelength of the radiation as it impinges on the image plane via the two optical paths. A processing circuit measures the displacement, amplitude and spectral content to provide a visual indication of the angular position of the radiation source. The use of two optical channels also provides a simplified cross correlation system for comparison of spectral sources with respect to a reference.

7 Claims, 5 Drawing Figures

SCANNING OPTICAL SPECTRAL ANALYZER

The invention described herein may be manufactured, used and licensed by or for the Goverment for Governmental purposes without the payment of any royalty thereon.

FIELD OF INVENTION

The present invention relates generally to apparatus for scanning a field of view to enable spectral information from a point source of optical radiation to be derived, and more particularly, to such apparatus wherein the optical energy is directed to an image plane by a pair of optical paths, one of which includes an optical dispersion means.

BACKGROUND OF THE INVENTION

Presently known optical spectrometers include a dispersion means, such as a prism or diffraction grating, which is effectively rotated in an optical path between a point source being spectrometrically analyzed and an image plane containing a detector for the source. These spectrometers are based on the principle that different wavelengths of the source being analyzed are deflected by differing amounts by the dispersion means. As the dispersion means is effectively rotated, different wavelengths of the source are passed through a slit positioned in front of the image plane, whereby the angular position of the dispersion means at any instant of time can be correlated with the wavelength of energy passing through the slit to a detector in the image plane. Devices utilizing a rotating dispersion means have generally been utilized only for detecting the position of stationary optical sources. Dispersive devices that have been designed for providing a spectrometric analysis of a moving optical source have generally required servomechanisms for pointing the analyzer at the source. For many applications, such analyzers are not wholly satisfactory because they require an initial knowledge of the source angular position to enable the device to be pointed directly at the source. If the angular position of the source in a field of view is initially unknown, such analyzers are generally incapable of detecting the presence of the source and enabling the source spectral content to be determined.

BRIEF DESCRIPTION OF THE INVENTION

In accordance with the present invention, apparatus is provided for scanning a field of view and enabling spectral information to be derived from a point of optical radiation in the scanned field. The spectral information is derived while the scanning process is performed so that an entire field of view can be scanned relatively rapidly with a scanner having an instantaneous narrow field of view to determine the existence of a source of interest in the field, as well as the spectral content of the source without modifying the scanning sequence. In the optical scanning process, radiation from successive scanned portions of the field of view are sequentially directed onto an image plane including a detector means for the optical radiation. To enable the spectral information to be determined, a first optical path is provided between the radiation source and the detector means, and includes the scanning means and a dispersion means for the radiation. A second optical path is established between the radiation source and the detector means and includes the scanning means. In a particular embodiment of the invention, the second path excludes the dispersion means. As a result of the dispersion means and the scanning means, there is a convolution of spectral energy from the source in the image plane and on the detector means, causing different wavelengths of the source to be spread out on the detector means over a longer time than if the dispersion means is not provided. In scanning, there is a displacement of the time positions for energy of the same wavelength as it is coupled to the detector means via the first and second optical paths. By comparing the time positions for the same wavelengths, a spectral analysis of the convoluted energy in the first optical path is obtained. The undispersed path also provides a reference for cross correlation or comparison with the spectral response of a target signal source.

Radiation from the point source coupled to the detector via the second optical path is convoluted as a pulse having a much narrower width than the convoluted energy coupled via the first path. By utilizing the relatively narrow pulse as a reference time position for a wavelength of the source being scanned, an indication can be derived of the energy at different spectral lines of the radiation.

In a specific embodiment of the invention, an extremely high resolution system is provided by utilizing a multiplicity of lenses that rotate together about a fixed, centrally located detector. In the path of only one of the lenses, a dispersion means is provided to enable the spectral analysis to be performed. The remaining lenses precisely establish the angular position of the source in the field of view with the assistance of a signal synchronized with the rotation of the lenses.

It is, accordingly, an object of the present invention to provide a new and improved scanning optical spectrometer.

Another object of the invention is to provide a new and improved scanning optical spectrometer for enabling spectral information to be derived from a point source anywhere in a continuously scanned field of view, without prior knowledge of the source location.

Another object of the invention is to provide a new and improved apparatus for scanning a field of view and enabling spectral and positional information of an optical point source in the field of view to be determined.

A further object of the invention is to provide a new apparatus for recognition of various sources according to their spectral character and for comparison with respect to a known reference source.

The above and still further objects, features and advantages of the present invention will become apparent upon consideration of the following detailed description of one specific embodiment thereof, especially when taken in conjunction with the accompanying drawings.

DESCRIPTION OF THE PREFERRED EMBODIMENT

Figure 1:
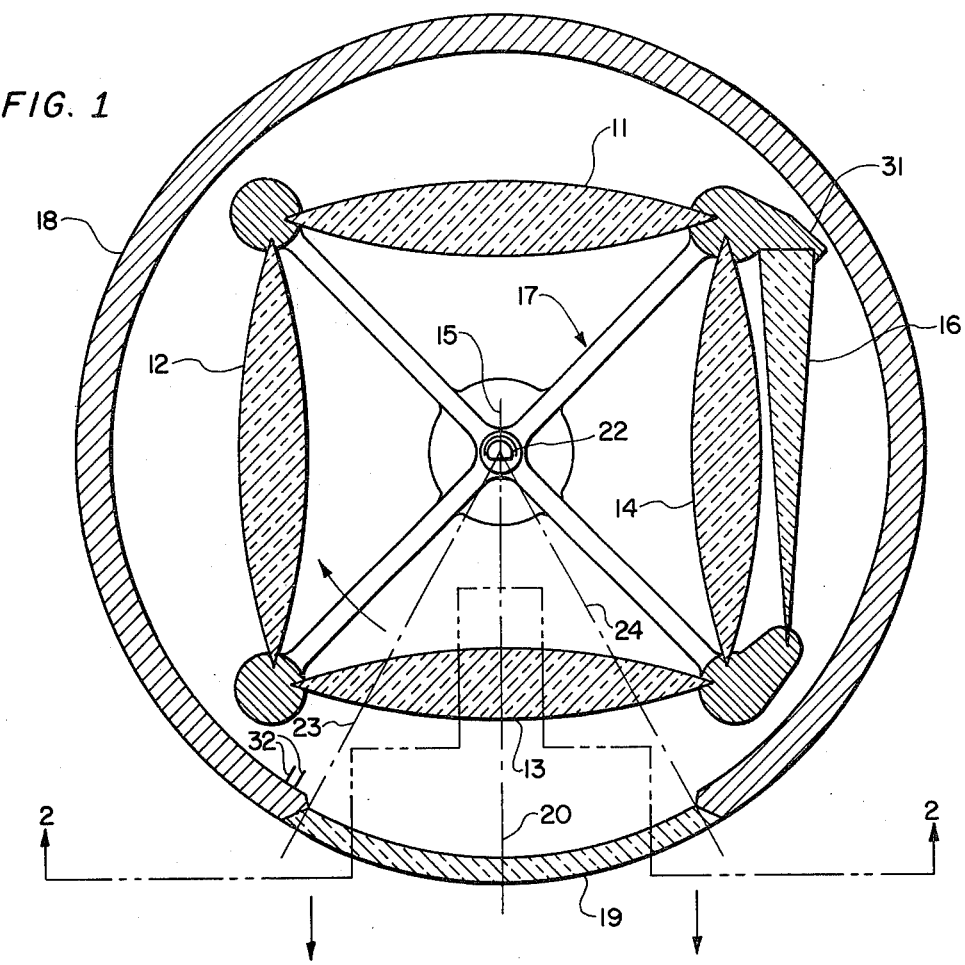
FIG. 1 is a top view of one preferred embodiment of an optical system in accordance with the present invention.
Figure 2:
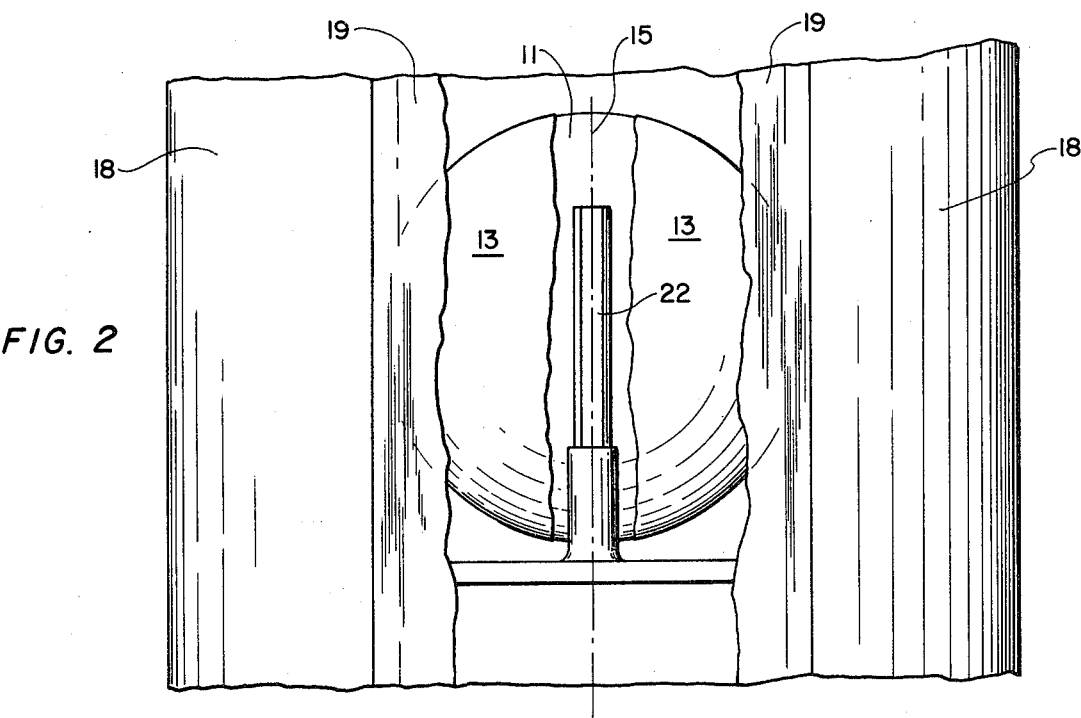
FIG. 2 is a front view taken through the lines 2—2 of FIG. 1.

Reference is now made to FIG. 1 of the drawing wherein there are illustrated four mutually orthogonal focusing lenses 11, 12, 13 and 14 which are driven at constant rotational speed by a suitable motor (not shown) about a central axis 15 that defines a focal point for the lenses. Positioned in front of and rotating with lens 14 is a dispersion means comprising prism 16. Lenses 11-14 and prism 16 are mounted on a common spider 17 that is disposed to rotate about axis 15 and includes radially extended arms to which the edges of the lenses are attached.

Surrounding spider 17 and the assembly, including lenses 11-14 and prism 16, and concentric with axis 15, is a cylindrical opaque housing 18. In housing 18 there is provided an aperture in which there is positioned an optically transparent arcuate dome 19 that subtends an angle of approximately 70° between radii 23 and 24 of axis 15 to define the field of view of the optical system.

Radiant energy from a point optical radiation source, such as a distant infra-red source, is focused by lenses 11-13 as a point on an image plane defined by axis 15. The point source is susceptible to movement, but spider 17 is rotated at a high enough speed to enable the source to be considered the same during each scan of the field of view by the four optical systems including lenses 11-14. To detect an infra-red point source image being cast on axis 15, infra-red detector 22, having a planar, rectangular receiving face, is provided. The face of detector 22 is positioned between axis 15 and dome 19 to receive radiation from a point source imaged by lenses 11-14. The plane including the face of detector 22 is at right angles to radius 20 that bisects the arc of dome 19; the detector face extends an equal amount on either side of the radius 20 by a relatively small amount. Detector 22 has a relatively large height so that a significant area in a plane extending in the same direction as axis 15 can be scanned as lenses 11-14 rotate about the axis and detector. As lenses 11-14 rotate, a narrow instantaneous field of view is scanned over the entire, relatively wide field of view defined by radii 23 and 24.

Figure 3:
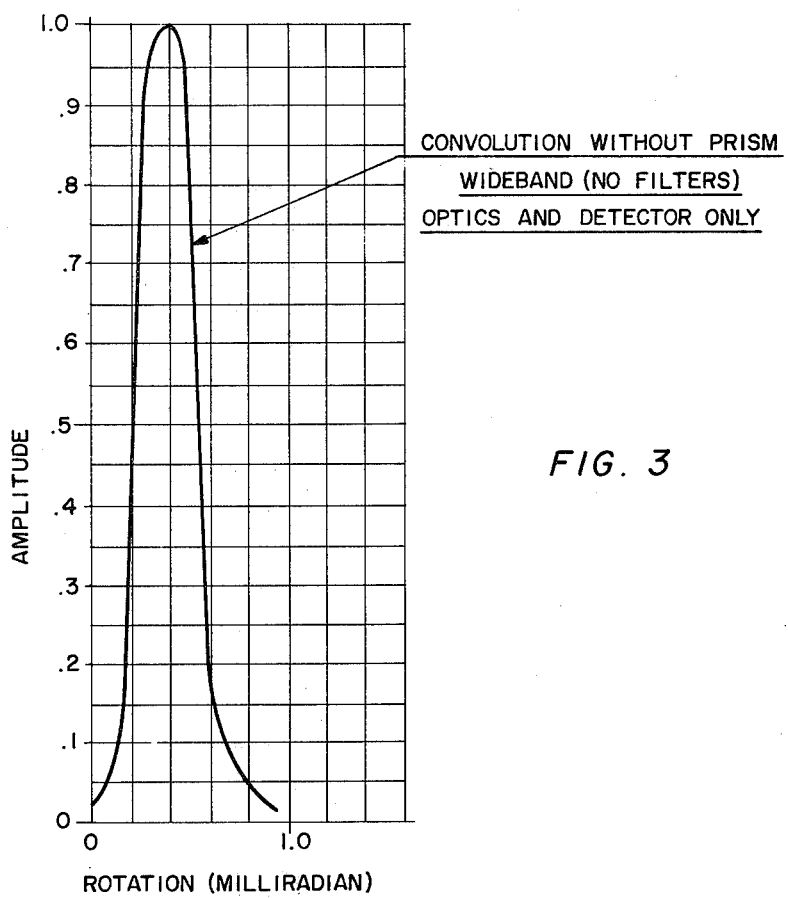
FIG. 3 is a plot of the response of a detector included in FIG. 1 when no dispersion means is included in the optical path to the detector.

Detector 22 derives an electrical output signal having an amplitude versus rotational position of spider 17 relationship indicated by FIG. 3 while one of lenses 11-13 is rotating between the source and detector 22. Radiation from the point source impinges on the planar surface of detector 22 while the centers of lenses 11-13 are substantially aligned with the point source and a portion of the planar surface. As lenses 11-13 rotate so there is no longer alignment of the point source, the center of one of the lenses, and the detector face, energy from the point source is no longer directed on the planar face of detector 22.

From FIG. 3, it is noted that the electrical signal is a relatively large amplitude, short duration pulse that is a convolution of the point source position over a relatively narrow arc length of one of the rotating lenses 11-13. The peak value of the pulse occurs at the center thereof, the point where the center of one of lenses 11-13 is aligned between the point source and the center line of the planar surface of detector 22. The width of the planar surface of detector 22, the distance between the planar surface 22 and axis 15, and the focal length of lenses 11-13 are such that the point source image spreads over the entire width of the planar surface of detector 22 when the point source and center of each of lenses 11-13 lies along radius 20. When the point source, the center of one of lenses 11-13, and the center line of detector 22 are aligned at an angle displaced from radius 20, the image does not fill the entire width of the detector. However, maximum radiation falls on the image plane of detector 22 when the center line of one of the lenses is aligned with the center of detector 22 and the point source for any particular angular position of the point source. As spider 17 rotates so the center of one of the lenses is no longer aligned with the center of detector 22 and the point source, the output of the detector decreases. Hence, prior to and after alignment of the center of one of lenses 11-13 with the point source and axis 15, the size of the image cast on detector 22 is less than during alignment and there is a defocusing of the radiant energy past on the detector, causing a decrease in the output of the detector. Thereby, the time position of the maximum output of detector 22 provides an indication of the angular position of the point source imaged on detector 22. Because the pulse is relatively narrow and there is no dispersive means in the optical path, a predetermined wavelength of the source can be considered as impinging on detector 22 at a time determined by the angular position of the point source in the scanned field of view.

As lens 14 and prism 16 rotate into the field of view, there is a spreading of the point source signal derived from detector 22 because of the dispersive properties of the prism. The different wavelengths of the point source are differentially refracted by prism 16 so that the path lengths of the shorter wavelengths are greater than those of the longer wavelengths. For the clockwise rotation of spider 17 and the pointed end of the prism leading the thicker end during rotation, as illustrated, the longer wavelengths of the point source impinge on detector 22 prior to the shorter wavelengths of the source as lens 14 and prism 16 rotate between radii 23 and 24; if the relative position of the prism and the rotation direction were changed, the shorter wavelengths would impinge on the detector prior to the longer wavelengths. Because of the differential path lengths of the optical path through lens 14 and prism 16, there is a considerably wider convolution of the radiant energy coupled via the optical path including lens 14 and prism 16 than the convolution for the optical path including lenses 11-13. There is a relative time displacement of the predetermined wavelength during a scan of the field of view by prism 16 and lens 14 compared to a scan by each of lenses 11-13.

Figure 4:
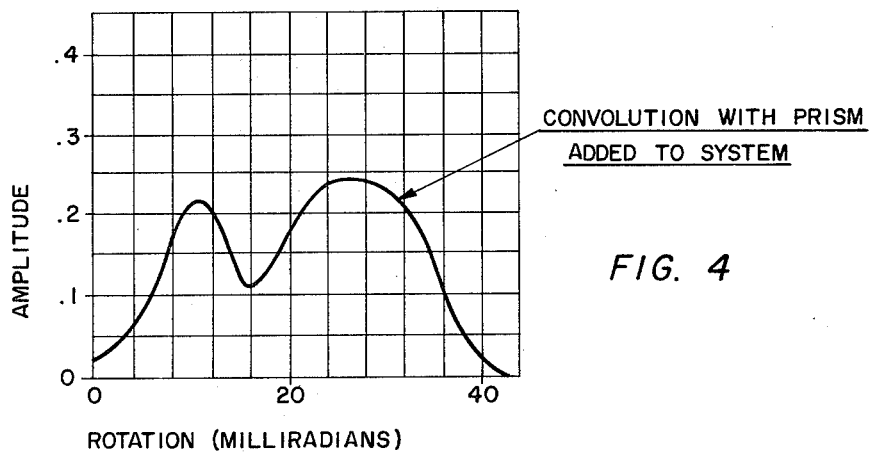
FIG. 4 is a plot of the output of the detector of FIG. 1 as a function of angular position when a dispersion means is in the optical path of the detector.

The nondispersed radiation which produces the convolution of FIG. 3, when dispersed, is convoluted in the manner illustrated in FIG. 4. In FIG. 4, it is noted that the time base is considerably in excess of the time base of the FIG. 3 waveform and that the amplitude of the peak energy is considerably less than that of FIG. 3. Also, the amplitude versus rotational position curve is not defined as a single peak, but includes peaks commensurate with the intensity of the radiation at different spectral lines of the source. Since all of the spectral lines of the nondispersed source occur simultaneously while the peak value of the pulse illustrated in FIG. 3 is being derived, the peak value is a time reference against which the spectral intensity of the different lines indicated in FIG. 4 is determined.

A plurality of lenses 11-13, without prisms in front of them, is employed to enable a more positive indication of the point source angular position in the field of view to be derived. It is of particular importance to determine the point source position accurately because this position is utilized as a reference base for ascertaining the spectral information when lens 14 and prism 16 are in the field of view.

At typical infra-red wavelengths, prism 16 is not completely transparent, but absorbs approximately 20% of the infra-red energy from the source. Also, as a result of the convolution process, the peak infra-red energy passing through lens 14 and prism 16 is considerably less than that which passes through lenses 11-13. Thereby, more accurate and greater information can be obtained relative to the position of the infra-red source with the three rotating lenses 11-13 than can be obtained regarding the spectral content of the point source of lens 14 and prism 16.

To establish a time reference signal at a predetermined angular position of spider 17, one arm of the spider includes an outwardly extending teat 31 which engages normally open contacts 32. As teat 31 engages contacts 32, the contacts are closed, whereby a positive D.C. voltage from a source connected to one of the contacts is coupled to the other contact to provide a pulse indicative of a reference angular position, e.g., zero degrees, of the optical assembly including lenses 11-14 and prism 16 in its travel about detector 22. The pulse derived in response to contacts 32 closing is combined with the output of detector 22 to determine the angular position of the point source, as well as to determine the spectral content of the point source.

A variation of this system employing a small instantaneous field of view of a dual channel optical scanner may be used to simplify spectral cross correlation and target recognition. One channel performs the convolution of the undispersed image of the target energy and the second channel performs the convolution of the dispersed target energy directed onto the photodetector. The convolution processes are sequential and at a predetermined or known time interval apart. The undispersed convolution integral serves as a normalization reference for the following cross correlation process. The convolution of the undispersed energy also serves as a time reference for determining the temporal occurrence of the various colors in the dispersed convolution. This mechanization eliminates the multiple time shifting and integration processes required when the time of occurrence of the convolution of the dispersed energy is unknown. It also eliminates delay techniques that are normally required in cross correlation when the total area under the dispersed convolution and a normalization factor must be determned before the cross correlation process can begin. Thus, having provided a normalization reference and a time-color synchronization reference, the distribution of the color content in the dispersed convolution can be determined or compared to a known reference by a simple cross correlation process not requiring shifting and normalization.

In addition, many objects in the total field of view can be processed rapidly by the simplified cross correlation to determine the cross correlation coefficient for each source. This is a measure of the degree of similarity between the spectral characters of the sources and the predetermined spectral character of interest. Determination of the cross correlation coefficient provides a simplified method for distinguishing closely identical spectral characters. The device, therefore, permits rapid classification of the various objects in the field of view according to their similarity to the predetermined spectral signature.

Figure 5:
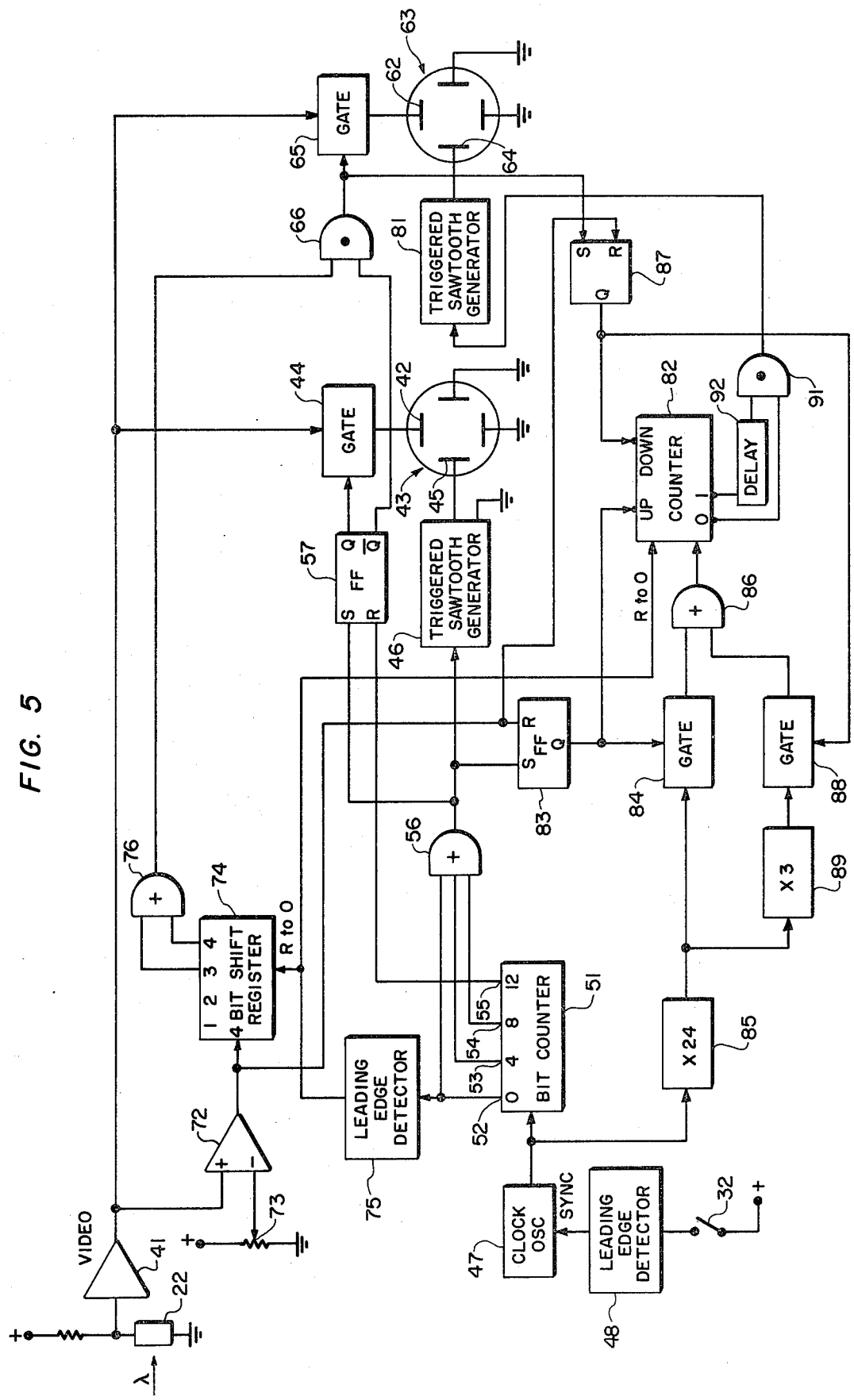
FIG. 5 is a circuit diagram of one embodiment of processing electronics that can be employed with the system of FIGS. 1 and 2.

Consideration is now given to apparatus which can be utilized for providing visual indications of the angular position of a single point source in the entire, wide field of view of detector 22, as well as for providing a visual indication of the spectral content of the target, by referring to the schematic circuit diagram of FIG. 5. Infra-red energy impinging on photo detector 22 is transduced into an electrical signal that is a replica of the amplitude versus time distribution of the infra-red energy impinging on the detector.

An indication of the position in the field of view of the point source is derived while lenses 11-13 are sweeping the field of view and can be visually ascertained by supplying the output signal of video amplifier 41 to vertical deflection plate 42 of cathode ray tube 43 through gate 44. Deflection of the cathode ray beam of tube 43 in the horizontal direction is synchronized with the movement of lenses 11-13 through the field of view. Thereby, the horizontal position of a pulse on the face of tube 43 indicates the angular position of the point source in the field of view.

To provide for synchronized horizontal deflection of the cathode ray beam, horizontal deflection plates 45 are responsive to a linear sawtooth voltage that is derived from triggered sawtooth generator 46. Sawtooth generator 46 is triggered at the beginning of each sweep of each of lenses 11-13 through the field of view between radii 23 and 24. To this end, there is provided a synchronized clock oscillator 47 which derives a predetermined number of pulses during each revolution of spider 17 about axis 15. In an exemplary case, sixteen pulses are derived for each revolution of spider 17, whereby four pulses from clock oscillator 47 are derived for each quadrant of revolution of spider 17.

To assure synchronization between oscillator 47 and the motion of spider 17, a pulse is supplied once each revolution of the spider to a synchronizing input terminal of oscillator 47. The synchronizing pulse is derived by sensing the closure of contacts 32 in response to engagement thereof by teat 31. In response to contacts 32 closing, a pulse is derived and sensed by leading edge detector 48, which is connected to be responsive to closure of the contacts. The short duration pulse derived by leading edge detector 48 is supplied to the synchronizing input terminal of clock oscillator 47.

Pulses derived from clock oscillator 47 are supplied to a sixteen bit counter 51 which includes decoding circuitry for deriving an output pulse indicative of spider 17 rotating into a new quadrant. To this end, counter 51 includes output terminals on which are derived pulses while the counter is in states 0, 4, 8 and 12 to indicate the beginning of each rotation quadrant of spider 17. The binary one signals derived from terminals 52, 53, and 54 are supplied to OR gate 56, which is connected to a trigger input terminal of triggered sawtooth generator 46. Sawtooth generator 46 responds to the leading edge of each of the pulses derived from OR gate 56, thereby to initiate a horizontal sweep between the horizontal deflection plates 45 of cathode ray tube 43. The period of triggered sawtooth generator 46 is approximately equal to the time required for one of lenses 11-13 to scan the field of view between radii 22 and 23. The time when a pulse is coupled to the vertical deflection plates 42 is thereby synchronized with the rotation of lenses 11-13 and an observer watching the face of cathode ray tube 43 is thereby provided with an indication of the angular position in the field of view of a point source monitored by detector 22.

To enable only the point source images coupled to detector 22 through lenses 11-13 to be displayed on cathode ray tube 43, to the exclusion of the point source images coupled through the optical path including prism 16 and lens 14, gate 44 is open only while spider 17 is rotating through the three quadrants while lenses 11-13 are sweeping the field of view past detector 22. To this end, the output of OR gate 56 is supplied to a set input terminal (S) of flip-flop 57. Flip-flop 57 includes a set output terminal (Q) on which is derived a binary one signal while the flip-flop is in a set state. The binary one output of the Q output terminal of flip-flop 57 is applied as an enable input to gate 44, whereby the gate is open to pass the output of video amplifier 41 to vertical deflection plates 42 while spider 17 is rotating through the three quadrants. Gate 44 is closed while spider 17 is rotating through the fourth quadrant, a result achieved by connecting output terminal 55 of counter 51 to the reset input terminal (R) of flip-flop 57. Energization of flip-flop 57 to the reset state causes the binary one output of flip-flop 57 to be removed, thereby closing gate 44.

Because the relative position of the point source during each scan of lenses 11-13 through the field of view is relatively stationary between adjacent scans, the time position of pulses coupled through gate 44 to vertical deflection plates 42 is essentially constant from one scan to another. Because of the persistence of vision of an observer and the storage properties of phosphors included on the face of cathode ray tube 43, the intermittently supplied pulses to deflection plates 42 appear continuous and stationary to the observer. By correlating the horizontal position of the face of cathode ray tube 43 in terms of angular field of view, the observer is thereby provided with an indication of the target angular position.

To determine the spectral content of the point source, the output of detector 22 is supplied through video amplifier 41 to the vertical deflection plates 62 of cathode ray tube 63 while lens 14 and prism 16 are sweeping through the field of view, provided an image of the point source has been coupled through each of lenses 11-13 during the same revolution of spider 17 as that of lens 14 and prism 16 which are responsive to energy of the point source. The spectral content of the point source is displayed as a funtion of wavelength by supplying a horizontal sweep voltage to horizontal deflection plates 64 of cathode ray tube 63. The horizontal sweep voltage is applied to deflection plates 64 in synchronism with the time when the point source image would have been coupled to detector 22 while lens 14 is sweeping the field of view if a dispersion prism 16 were not located in the optical path including lens 14. Thereby, there is a displacement of the time during a scan of the field of view of a wavelength of radiation from the point source as the wavelength is imaged on the image plane of detector 22 for the optical path including the lenses 11-13 relative to the time the same wavelength is imaged on the image plane of detector 22 via the optical path including lens 14 and prism 16.

To enable the output of video amplifier 41 to be coupled to the vertical deflection plate 62 only during the fourth quadrant, while lens 14 and prism 16 are scanning the field of view, provided the point source has been detected three times during the same revolution of spider 17, gate 65 is provided and connected between the output of amplifier 41 and vertical deflection plates 62. Gate 65 is opened in response to a binary one signal derived from AND gate 66. AND gate 66 receives an enable signal from the reset output terminal (Q) of flip-flop 57 while lens 14 and prism 16 are scanning the field of view. This result is assured since the reset input terminal (R) of flip-flop 57 is responsive to a binary one signal derived from terminal 55 of counter 51. With AND gate 66 enabled by flip-flop 57 being in a reset state, a binary one signal is passed through the AND gate when the point source has been detected three times during the same revolution of spider 17 preceding the rotation of lens 14 and prism 16 in the field of view.

To this end, threshold comparator 72, including input terminals responsive to the output of video amplifier 41 and a reference voltage at a tap of potentiometer 73, is provided. In response to the amplitude of the infra-red energy transduced by detector 22 exceeding a predetermined level, a finite output is derived from threshold detector 72. The finite output is derived as long as the optical energy is above a reference level. Thereby, in response to a point source being imaged on detector 22 by lenses 11-13, relatively short duration pulses are derived from threshold comparator 72, while a longer duration pulse is derived from the threshold comparator in response to a convoluted image being coupled to detector 22 through prism 16 and lens 14.

The output of threshold comparator 72 is applied to a shift input of four bit shift register 74. At a predetermined angular position during each revolution of spider 17, shift register 74 is reset to a zero state, a result achieved by coupling the signal at terminal 52 of counter 51 to leading edge detector 75, which is coupled to a reset to zero input terminal of register 74. In response to a point source being detected during a first quadrant of revolution of spider 17, a pulse output of threshold comparator 72 activates shift register 74 so that a binary one signal is loaded in the first stage of the shift register. In response to pulses derived from threshold comparator 72 during the second, third and fourth quadrant sweeps by lenses 12, 13 and 14, the pulse loaded in the first stage of shift register 74 is shifted to the second, third and fourth stages of the shift register. Output terminals of the third and fourth stages of shift register 74 are connected to input terminals of OR gate 76. Thereby, in response to three or four pulses being detected during a complete revolution of spider 17, a binary one signal is derived from OR gate 76. The binary one level derived from OR gate 76 is coupled to AND gate 66, whereby the AND gate derives a binary one level during the fourth quadrant of the rotation of spider 17 provided three pulses of the point source were detected during the revolution of the spider.

To enable the convoluted image impinging on detector 22 to be converted into an amplitude versus time spectral plot, triggered sawtooth generator 81 is connected to drive the horizontal deflection plates 64 of cathode ray tube 63.

The period of each sweep of generator 81 is equal approximately to the time required for the convoluted signal from lens 14 and prism 16 to be derived from video amplifier 41, which is determined by the quotient of the dispersion of prism 16 and the rotation speed of spider 17. The face of cathode ray tube 63 is provided with a horizontal scale commensurate with wavelength to enable an observer to determine the spectral signature of the point source. The spectral resolution of the image presented on the face of cathode ray tube 63, and therefore the length of the horizontal scale divisions on the face of the tube, is proportional to the quotient of the angle subtended by the planar face of detector 22, between radii 23 and 24, the rotary speed of spider 17, and the dispersion of prism 16.

To activate sawtooth generator 81 at a time when a pulse would have been received by detector 22 through lens 14 if prism 16 were not provided, and thereby establish a time base for the angular position of the point source during the fourth quadrant, up-down counter 82 is provided. During the first three rotation quadrants of spider 17, counter 82 is responsive to pulses derived from oscillator 47 and at the completion of each scan, counter 82 receives a count indicative of the angular position of the point source in the field of view of lenses 11-13. Thereby, at the end of three quadrants, counter 82 stores a count indicative of three times the angular position of the point source. During the fourth quadrant, counter 82 is counted down at a rate three times that at which it is counted up during the first three quadrants, whereby the counter is restored to a count of zero at a time during the fourth quadrant when the point source would have been coupled to detector 22 through an optical path that did not include dispersion prism 16. In response to counter 82 returning to a count of zero, triggered sawtooth generator 81 is activated.

To these ends, counter 82 includes a count input terminal, an "up count" input control terminal, a "down count" input control terminal, as well as output terminals for the zero and one states of the counter. Counter 82 also includes a reset to zero terminal whereby the counter is reset to zero without going through the normal down count sequence. To assure counter 82 being in a zero state at the beginning of each revolution of spider 17, the reset to zero input terminal of the counter is connected to be responsive to the output of leading edge detector 75.

During the first three quadrants of rotation of spider 17, the "up count" input control terminal of counter 82 is supplied with a binary one signal, causing the counter to count upwardly, a result achieved by applying an output signal from a set output terminal (Q) of flip-flop 83 to the "up count" control input terminal of the counter. Flip-flop 83 includes a set input terminal (s) that is responsive to the binary one output signal of OR gate 56. Flip-flop 83 also includes a reset input terminal (R) which is responsive to the output signal of threshold comparator 72. Thereby, flip-flop 83 remains in a set state only from the beginning of a quadrant until a point source is detected during the quadrant, as evidenced by the output signal of threshold comparator 72. The set output terminal of flip-flop 83 also controls coupling of pulses to the count input terminal of counter 82 while counter 82 is in an up count condition, a result attained by coupling the binary signal at the set output terminal of flip-flop 83 to gate 84. Gate 84 feeds clock pulses, derived from frequency multiplier 85 that is responsive to clock oscillator 47, through OR gate 86 to the count input terminal of counter 82. Frequency multiplier 85 has a relatively high multiplication factor, such as 24, to provide a relatively high resolution for the angular position of a point source during a sweep by lenses 11-13. When gate 84 is opened, it passes pulses from the output of frequency multiplier 85 to the count input of counter 82 only during the interval from the beginning of a quadrant of a revolution of spider 17 to the time when the point source is imaged on detector 22 during the quadrant. Thereafter, gate 84 is closed, whereby during each of first three rotation quadrants of spider 17 counter 82 is supplied with a number a pulses representing the angular position of the target.

During the fourth quadrant of the rotation of spider 17, counter 82 is changed from an up count to a down count state by supplying a binary one signal to the down input control terminal of the counter. The binary one signal is supplied to the down input control terminal of counter 82 by the set output terminal (Q) of flip-flop 87. Flip-flop 87 includes a set input terminal (S) that is responsive to a binary one signal derived from AND gate 66. Flip-flop 87 also includes a reset input terminal (R) responsive to the output of threshold comparator 72. Thereby, flip-flop 87 derives a binary one signal only during the interval from the beginning of the fourth quadrant until derivation of a pulse from video amplifier 41 during the fourth quadrant.

The output signal of flip-flop 87, in addition to activating the "down count" input control terminal of counter 82, controls gating of pulses to the count input terminal of counter 82 during the fourth quadrant. To this end, the set output terminal (Q) of flip-flop 87 is connected to a control input terminal of gate 88 which is responsive to frequency multiplier 89, having a multiplication factor of three. Frequency multiplier 89 is responsive to the output of frequency multiplier 85, whereby the number of pulses coupled through multiplier 89 during the fourth quadrant is equal to the total of the number of pulses passed through gate 84 during the preceding three quadrants. The output of gate 88 is supplied as an input to the count input terminal of counter 82 through OR gate 86. Thereby, during the fourth quadrant, the count of counter 82 is stepped downwardly to reach a count of zero at the same relative time that a pulse is derived from threshold comparator 72 during the first three quadrants.

To detect counter 82 being driven back to a count of zero during the fourth quadrant, the zero and one count output terminals of counter 82 are coupled to AND gate 91, with coupling from the count one output terminal to the AND gate being through delay network 92, having a delay time equal to the time between adjacent pulses derived from gate 88. Thereby, a binary pulse is derived from AND gate 91 only in response to counter 82 returning to a zero count while the counter is activated to the down count state; a binary one signal cannot be derived from AND gate 91 in response to counter 82 reaching the zero state through some other mechanism, such as resetting. The binary one output pulse of AND gate 91 is coupled to the trigger input of sawtooth generator 81 to achieve the desired synchronized horizontal sweep of cathode ray tube 63.

While there has been described and illustrated one specific embodiment of the invention, it will be clear that variations in the details of the embodiment specifically illustrated and described may be made without departing from the true spirit and scope of the invention as defined in the appended claims.

What is claimed is:

1. Apparatus for scanning a relatively wide field of view and enabling spectral information from a point source of optical radiation in the field to be derived comprising detector means for detecting the radiation; means having a relatively narrow instantaneous field of view for optically scanning the wide field of view to sequentially direct radiation from successively scanned portions of the wide field of view onto the detector means; optical dispersion means for dispersing the radiation; a first optical path for the radiation including the dispersion means, the scanning means and the detector means; and a second optical path for the radiation including the scanning means and the detector means; the dispersion means and the scanning means of said first path causing a convolution of spectral energy from the source on the detector means displaced in time from the spectral energy directed onto the detector through the second optical path during a scan of a wavelength of radiation from the source.

2. The apparatus of claim 1 further including means responsive to the detector means for indicating the time displacement, and means for establishing a time reference signal at a predetermined scanning position.

3. The apparatus of claim 2 further including means for indicating the level of energy with respect to time in the wavelength of the source as coupled to the detector means through the second optical path.

4. The apparatus of claim 3 further including means responsive to energy coupled to the detector means through the first and second optical paths for indicating the amplitude versus spectral content of the source.

5. The apparatus of claim 4 wherein said detector means is stationary and said scanning means includes a plurality of focusing lenses rotating about said detector so that each of the lenses successively images radiation from the source on the detector means at a different time, said dispersion means including a prism mounted for rotation with one of said lenses, said time reference signal being synchronized with the rotation of said lenses and occurring at a predetermined angular position.

6. The apparatus of claim 5 further including means responsive to the detector means via the plurality of lenses for indicating the angular position of the source in the field of view.

7. The apparatus of claim 6 wherein said scanning means includes a cylindrical housing having a transparent window, said detector means being disposed along a central axis of said housing, means rotatably holding said plurality of lenses between said window and detector, and said time reference means includes a switch positioned at said predetermined angular position for activation by rotation of said lenses.

* * * * *